(12) United States Patent
Zimmerman et al.

(10) Patent No.: US 11,288,370 B2
(45) Date of Patent: Mar. 29, 2022

(54) TRANSLUCID ACCESS TO STORAGE DEVICES

(71) Applicant: Western Digital Technologies, Inc., San Jose, CA (US)

(72) Inventors: Israel Zimmerman, Ashdod (IL); Judah Gamliel Hahn, Ofra (IL); Danny Berler, Tel-Mond (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 128 days.

(21) Appl. No.: 16/450,171

(22) Filed: Jun. 24, 2019

(65) Prior Publication Data

US 2020/0104496 A1 Apr. 2, 2020

Related U.S. Application Data

(60) Provisional application No. 62/738,822, filed on Sep. 28, 2018.

(51) Int. Cl.
*G06F 21/56* (2013.01)
*G06F 3/06* (2006.01)

(52) U.S. Cl.
CPC .......... *G06F 21/566* (2013.01); *G06F 3/0604* (2013.01); *G06F 3/0622* (2013.01); *G06F 3/0634* (2013.01); *G06F 3/0659* (2013.01); *G06F 3/0673* (2013.01); *G06F 21/567* (2013.01); *G06F 2221/034* (2013.01)

(58) Field of Classification Search
CPC .... G06F 21/566; G06F 3/0604; G06F 3/0622; G06F 3/0634; G06F 3/0659; G06F 3/0673; G06F 21/567; G06F 2221/034
See application file for complete search history.

(56) References Cited

U.S. PATENT DOCUMENTS

| | | | | |
|---|---|---|---|---|
| 5,956,743 A * | 9/1999 | Bruce | ................. | G06F 11/1068 711/103 |
| 6,282,602 B1 * | 8/2001 | Blumenau | ............... | G06F 3/061 711/111 |
| 6,292,602 B1 * | 9/2001 | Suzuki | ............... | H04B 10/0775 385/24 |
| 6,922,734 B2 | 7/2005 | Teicher | | |
| 7,854,006 B1 * | 12/2010 | Andruss | ................ | G06F 21/562 726/24 |
| 8,127,059 B1 * | 2/2012 | Carr | ...................... | G06F 13/387 710/74 |
| 8,601,169 B1 * | 12/2013 | Paragaonkar | ......... | G06F 3/0673 710/6 |
| 9,064,116 B2 | 6/2015 | Triantafillou et al. | | |

(Continued)

OTHER PUBLICATIONS

Hashiba, Junki et al.; "An Inductively Powered Wireless Solid-State Drive System with Merged Error Correction of High-Speed Wireless Data Links and NAND Flash Memories", IEEE Journel of Solid-State Circuits; http://www.ieee.org/publications_standaards/publications/rights/index.html IEEE 2015 (10 pages).

*Primary Examiner* — Yonas A Bayou
(74) *Attorney, Agent, or Firm* — Patterson & Sheridan, LLP; Steven H. Versteeg

(57) ABSTRACT

The present disclosure generally relates to a translucid access method and apparatus to a host allowing access to data contained within the host.

15 Claims, 2 Drawing Sheets

(56) References Cited

U.S. PATENT DOCUMENTS

| | | | |
|---|---|---|---|
| 2004/0236899 A1* | 11/2004 | Teicher | G06K 19/07732 |
| | | | 711/103 |
| 2012/0117348 A1* | 5/2012 | Triantafillou | G06F 21/566 |
| | | | 711/163 |
| 2012/0254999 A1* | 10/2012 | Sallam | G06F 21/566 |
| | | | 726/23 |
| 2016/0179223 A1* | 6/2016 | Konanur | G06K 9/00087 |
| | | | 345/179 |
| 2016/0276865 A1* | 9/2016 | Pike | H02J 7/14 |
| 2017/0136894 A1* | 5/2017 | Ricci | B60L 50/53 |
| 2017/0138758 A1* | 5/2017 | Ricci | B60L 53/53 |
| 2017/0156466 A1* | 6/2017 | Lambrechts | A45C 11/24 |
| 2018/0237161 A1* | 8/2018 | Minnick | B60L 53/14 |

\* cited by examiner

TRANSLUCID ACCESS TO STORAGE DEVICES

CROSS-REFERENCE TO RELATED APPLICATIONS

This application claims benefit of U.S. Provisional Patent Application Ser. No. 62/738,822, filed Sep. 28, 2018, which is herein incorporated by reference.

BACKGROUND OF THE DISCLOSURE

Field of the Disclosure

Embodiments of the present disclosure generally relate to storage devices. More specifically aspects of the disclosure relate to access to storage devices for use of data.

Description of the Related Art

Host computer devices obtain, process and transmit data related to a variety of matters. Host computer devices, such as phones, computers, tablets, and other electronics store and protect the data to ensure that a user may fully use the data to a maximum advantage. Those host computer devices include storage devices as embedded chips or storage modules like: uSD, NVMe.SSD, and NAND chips.

There is a need to be able to access data on the storage device (read and write) while no host is connected on different scenarios for example: on a production line or while the host in a "brick" (unusable condition).

There is also a need to access the storage device during production to bring up phase or fast update the production image directly to the storage device.

There is also a need to be able to access a host when the host is in a "sleep" mode and conventional methods of accessing data are ineffectual.

There is a further need to provide a low cost alternative to protecting data and to be able to retrieve data under all conditions of the memory arrangement that contains the data.

In some scenarios, there is a need to access the data on transparent connection while the host is working with the storage device for example: malware scan without hide and seek running capability on the host CPU.

Unfortunately, programs, such as malware, exist that seek to illegally obtain data and infect the host to allow a third party to corrupt the data, including firmware running the computer. The data may contain bank account information, personally sensitive information and other materials that should be kept secret.

Due to the innovation of malware, there is a need to be able to obtain data from a host when malware has penetrated host defenses such that data may be retained from the host.

An industry has been created to prevent access to the secret information. Computer programs have been created to limit the amount of access a third party may have to sensitive information. While these attempts at protecting the data have been generally successful, innovation exists in the creation of the malware access programs by third parties.

There is a further need to provide access to the management interface or log data on storage device for testing or to determine problem cause.

SUMMARY OF THE DISCLOSURE

The present disclosure generally relates to a translucid access method and apparatus to allow a host access to data on a storage device contained within the host. The storage device can be an embedded soldered chip or a module on a socket/connector that stores data.

In one embodiment, an arrangement is disclosed comprising at least one PHY, at least one translucid PHY, a logic circuit connected to the at least one PHY and the at least one translucid PHY, and a central processing unit connected to the logic circuit.

In another embodiment, a method to access data from a memory storage arrangement is disclosed comprising activating a central processing unit for the application specific integrated circuit and accessing data through action of the central processing unit, wherein the data is within the memory storage arrangement.

In another embodiment, a method to access data from a memory storage arrangement, comprising: producing an electric current within an application specific integrated circuit; switching a translucid PHY from a sleep mode to an operating mode; activating a central processing unit for the application specific integrated, circuit and accessing data through action of the central processing unit, wherein the data is within the memory storage arrangement.

In another non-limiting embodiment, an arrangement for accessing data from a memory storage arrangement is disclosed comprising: means for charging a Wi Charged coil to produce a magnetic field; means for receiving the magnetic field at a translucid PHY of an application specific integrated circuit to produce an electric current within the circuit, means for activating a central processing unit for the application specific integrated circuit, and means for accessing data through action of the central processing unit, wherein the data is within the memory storage arrangement.

In another non-limiting embodiment, a method to access data from a memory storage arrangement is disclosed comprising: using a Wi Charged arrangement to produce an energy input into a translucid PHY of an application specific integrated circuit to produce an electric current within the circuit; activating a central processing unit for the application specific integrated circuit; and accessing data through action of the central processing unit, wherein the data is within the memory storage arrangement.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
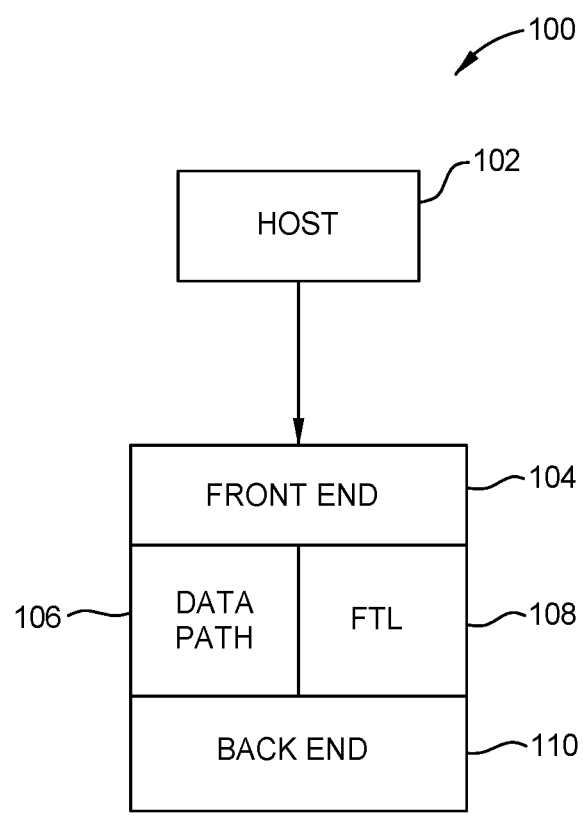
FIG. 1 is a schematic diagram of a host system and storage arrangement.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage. In the embodiments described, a data storage arrangement is connected to the host system. The function of the data storage arrangement is to accept data and store the data until needed again by a user or the host. The data storage arrangement may be configured to accept bursts of data, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a PCIe Interface, SAS Interface or Serial ATA (SATA) compatible interface, as a non-limiting embodiments. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as TCG Pyrite password protection. In some embodiments, the data storage arrangement may be configured with software that allows the data storage arrangement to create a hardware lock. Such hardware locks may prevent access through the host connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. In the illustrated embodiment, a form factor of 2.5 inches is provided. Other form factors such as M.2 or U.2 may also be used. Compatibility of the data storage arrangement may be provided for Windows operating systems, Windows Server, and Linux, as non-limiting embodiments. Example Windows operating systems that may use the system may be Windows 10, Windows 8 and Windows 7.

FIG. 1 is a schematic diagram of a conventional arrangement for a storage arrangement connected to a host 102. The storage arrangement comprises a front end 104, a back end 110, a data path 106 and a flash translation layer 108. The host 102 may be a computer, cell phone, table, personal digital assistant or other computing device. Data is stored in the storage arrangement for use by the host 102. The storage arrangement is provided with a front end 104 which is defined as the portion of the storage arrangement that directly interfaces with the host 102.

The flash translation layer 108 interfaces with memory storage units such that data that must be written to a new location or empty page is written to that discrete memory element and then a diversion is performed for subsequent read requests based upon the new address. The flash translation layer 108 also ensures that pages are distributed across available flash such that wearing occurs evenly for the unit as a whole. The flash translation layer 108 may also keep a list of all invalid pages (i.e. old pages) for the purpose of recycling the invalid pages at a future time.

The data path 106 is configured to perform data processing functions within the storage arrangement. The data path 106 may contain processors and/or controllers as necessary to enable the processing functions to occur. The back end 110 is not directly accessible to the user and performs storage functions.

Figure 2:
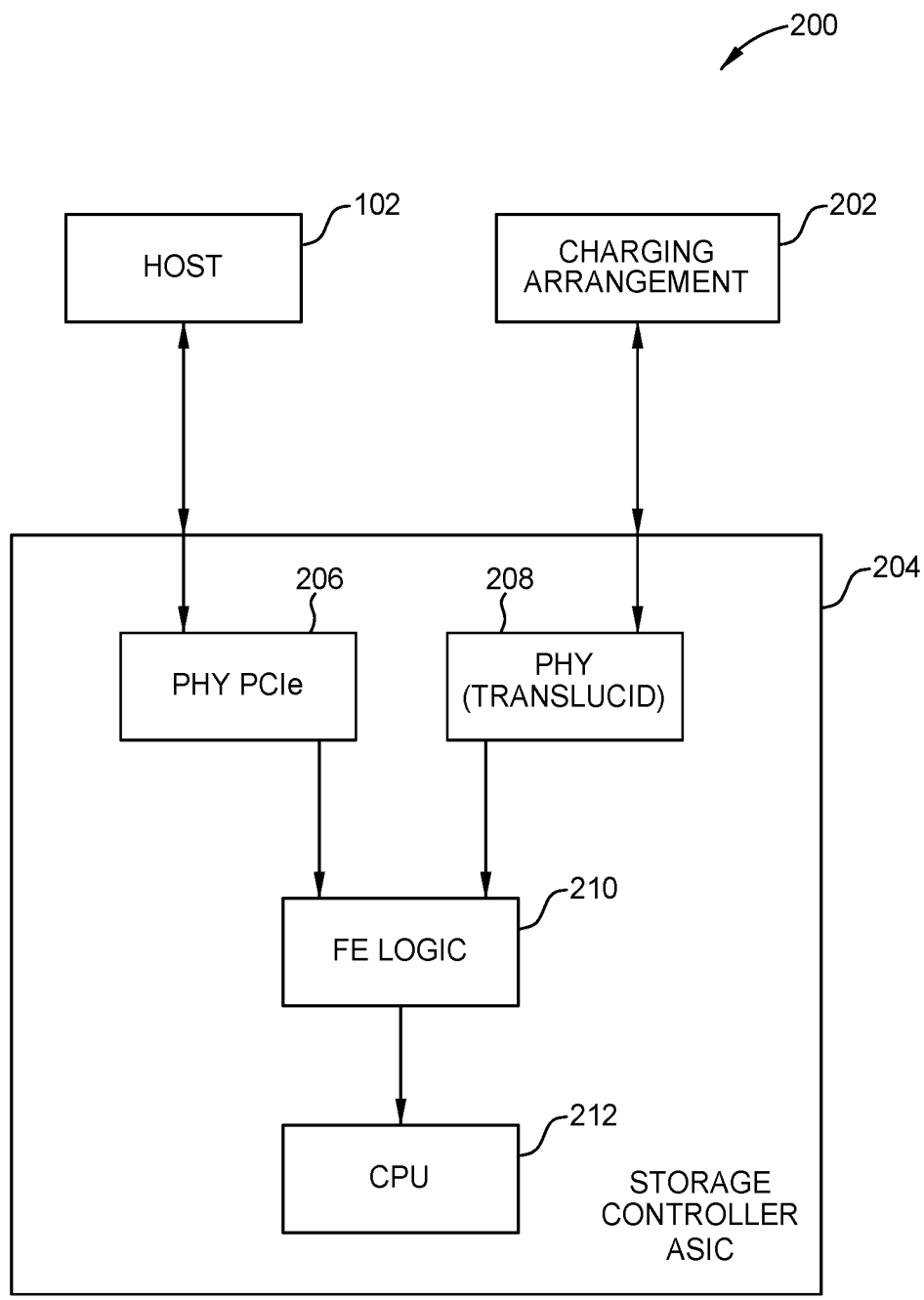
FIG. 2 is a schematic diagram of an example embodiment of an aspect of the disclosure providing a translucid channel to a storage controller application specific integrated circuit.

Referring to FIG. 2, an arrangement 200 for performing functions of being able to access data that is used by a host 102 is shown. In the illustrated embodiment, a second channel is created that interfaces with the storage application specific integrated circuit ("ASIC"). As will be understood, the storage ASIC 204 may be located in a controller and, for example, located within the data path 106, in a non-limiting embodiment. The ASIC 204 is configured to control functions of a memory arrangement, such as a solid state drive, a hard disk, a hybrid drive or other such arrangement used to store data.

A charging arrangement 202 is provided and is connected to a PHY (translucid) 208 through a wireless connection and is dedicated to a translucid channel. The PHY (translucid) 208 is further connected to a FE logic circuit 210 within the ASIC 204. A central processing unit ("CPU") 212 is also provided within the storage controller ASIC 204 to provide for computing functions.

The charging arrangement 202 is configured to induce a charge within the PHY (translucid) 208 through inductive coupling. The charging arrangement 202 may provide a resonant coil that is matched to the circuit created in the PHY (translucid) 208 so that a minimum of losses occurs when charge is provided by the charging arrangement 202. In the embodiment illustrated in FIG. 2, the charging arrangement 202 is frequency tuned to the PHY (translucid) 208. The charging arrangement 202 is illustrated as a transmitter type arrangement and the PHY (translucid) 208 is a receiver type arrangement. The charging arrangement 202 is also configured to receive data from the PHY (translucid) 208

Further referring to FIG. 2, the host 102 is connected to a PCIe PHY 206 which in turn is connected to the FE Logic 210 and the CPU 212 through the FE logic 210. As will be understood, the PHY 206 may be any type of PHY and not limited to a PCIe type PHY.

As provided in FIG. 2, the charging arrangement 202 allows for electrical power to be provided to the storage controller ASIC 204 such that power may be provided to perform CPU functions. In one embodiment, the charging arrangement 202 may be a magnetic coil arrangement. In other embodiments, the charging arrangement 202 may provide other types of energy, such as light energy through a laser. As will be understood, an interface may be used for such laser interaction, such as a Wi charged coil. In the embodiment of an interface, a single interface or a number of interfaces may be used to receive the energy produced by the Wi Charged coil. In a non-limiting embodiment where a case is used to protect internal computer/electrical components, the interface may be placed on the outer face of the case for reception of the energy and transmission to within the case. In other embodiments, the charging arrangement 202 may be wireless in its configuration and may or may not supply electrical power to the CPU 212. In other embodiments, a Li Fi arrangement may be used for fast transmission of data to and from the ASIC 204.

In embodiments, the charging arrangement 202 is configured to interface with the storage controller ASIC 204 that in turn is able to obtain data storage within a storage arrangement. Thus, information may be downloaded from the storage arrangement at times needed by a user. These times may include during normal operation or when malware has impacted the storage arrangement and problems exist in obtaining data through conventional operations. As will be understood, scanning for malware may commence at the start of communications with the ASIC 204 or may take place at other times, such as after establishing a connection between the charging arrangement 202 and the PHY (translucid) 208.

In embodiments, when both conventional means are being used by a host 102 to obtain data through access of the ASIC 204 and the charging arrangement 202 are used at the same time, a preference may be established by the FE logic 210 circuit to use either the host 102 request or the charging arrangement 202 request as the primary or dominant request. In these embodiments, the primary request will be fulfilled and other requests from the secondary or non-selected path will be ignored. Thus, if malware prevents the PHY PCIe 206 from being used, the PHY (translucid) 208 related to translucid functions may be active.

The CPU 212 in the ASIC 204 is configured to interact with the memory storage arrangements within, for example, the back-end 110 and the data path 106 as non-limiting embodiments. Such connections may be supplied to directly access requested data, therefore minimizing the potential effects of malware that has successfully entered the arrangement.

As provided above, the PHY (translucid) 208 is used for providing access to data. Two different modes may be used to provide the secure direct access. An operating mode may be provided wherein a direction connection to the storage device is established to enable identifying subspecies malware file searches with read access to the storage device while the host can perform read and write access. In a second sleep mode for the PHY (translucid) 208, no communication may be made to the host or without any power from the board using air power to wake the storage device only and communicate with the storage device. Switching from the two different modes may be accomplished through actions of the ASIC 204, such as the FE logic 210 circuit.

As will be understood, in addition to providing for identification of malware through the PHY (translucid) 208, other functions may be performed. Data may be offloaded or read through the PHY (translucid) 208 as a secure channel has been established. Resolutions/solutions may also be copied to the data storage arrangement to eliminate malware threats, if needed.

In another example embodiment, an arrangement is disclosed comprising: at least one PHY; at least one translucid PHY; a logic circuit connected to the at least one PHY and the at least one translucid PHY; and a central processing unit connected to the logic circuit.

In another embodiment, the arrangement may be configured wherein the at least one PHY, at least one translucid PHY, logic circuit and the central processing unit are placed within an application specific integrated circuit.

In another embodiment, the arrangement may further comprise a Wi Charged coil.

In another example embodiment, the arrangement may be configured wherein the at least one PHY is a PCIe phy.

In a further non-limiting embodiment, the arrangement may include a configuration where the translucid PHY is configured to interface with a Wi Charged coil.

In one embodiment, an arrangement, comprises: a storage controller ASIC, including: at least one CPU; at least one logic circuit coupled to the at least one CPU; at least one PHY coupled to the at least one logic circuit; and at least one translucid PHY coupled to the at least one logic circuit; and at least one charging arrangement coupled to the storage controller ASIC. The at least one charging arrangement is coupled to the at least one translucid PHY. The at least one charging arrangement comprises a magnetic coil. The at least one charging arrangement is a laser. The at least one charging arrangement comprises a Wi charged coil. The at least one charging arrangement is wirelessly coupled to the storage controller ASIC. The at least one charging arrangement is capable of providing electrical power to the at least one CPU. The at least one translucid PHY is capable of providing access to data. The at least one translucid PHY has an operating mode where the at least one translucid PHY is capable of identifying subspecies malware file searches with read access to storage device. The at least one translucid PHY has a sleeping mode where the at least one translucid PHY is capable of providing no communication to a host device and can communicate with a storage device. The at least one translucid PHY is switchable between the sleeping mode and the operation mode using the at least one logic circuit. The at least one translucid PHY is capable of identifying malware.

In a further non-limiting embodiment, a method to access data from a memory storage arrangement is disclosed comprising: charging a Wi Charged coil to produce a magnetic field, receiving the magnetic field at a translucid PHY of an application specific integrated circuit to produce an electric current within the circuit, activating a central processing unit for the application specific integrated circuit; and accessing data through action of the central processing unit, wherein the data is within the memory storage arrangement.

In a further example embodiment, the method may be performed wherein the memory storage arrangement is a solid state drive.

In another example embodiment, the method may further comprise transmitting the accessed data through the translucid PHY.

In an example embodiment, a method to access data from a memory storage arrangement is disclosed comprising charging a Wi Charged coil to produce a magnetic field; receiving the magnetic field at a translucid PHY of an application specific integrated circuit to produce an electric current within the circuit; switching the translucid PHY from a sleep mode to an operating mode; activating a central processing unit for the application specific integrated circuit; and accessing data through action of the central processing unit, wherein the data is within the memory storage arrangement.

In another non-limiting embodiment, the method may be performed wherein the memory storage arrangement is a solid state drive.

In another non-limiting embodiment, the method may be performed wherein the memory storage arrangement is a hybrid drive.

In another non-limiting embodiment, the method may further comprise transmitting the accessed data through the translucid PHY.

In one non-limiting embodiment, an arrangement for accessing data from a memory storage arrangement is disclosed comprising means for charging a Wi Charged coil to produce a magnetic field; means for receiving the magnetic field at a translucid phy of an application specific integrated circuit to produce an electric current within the circuit; means for activating a central processing unit for the application specific integrated circuit; and means for accessing data through action of the central processing unit, wherein the data is within the memory storage arrangement.

In one example embodiment, the arrangement may further comprise means for transmitting the accessed data through the translucid PHY.

In one example embodiment, arrangement for accessing data from a memory storage arrangement is disclosed comprising: means for charging a Wi Charged coil to produce a magnetic field, means for receiving the magnetic field at a translucid PHY of an application specific integrated circuit to produce an electric current within the circuit, means for switching the translucid PHY from a sleep mode to an operating mode, means for activating a central processing unit for the application specific integrated circuit and means for accessing data through action of the central processing unit, wherein the data is within the memory storage arrangement.

In another non-limiting embodiment, a method to access data from a memory storage arrangement is disclosed comprising: using a Wi Charged arrangement to produce an energy input into a translucid PHY of an application specific integrated circuit to produce an electric current within the circuit, activating a central processing unit for the application specific integrated circuit; and accessing data through action of the central processing unit, wherein the data is within the memory storage arrangement.

In a further non-limiting embodiment, the method may further comprise performing a scan of the memory storage arrangement for malware.

While the foregoing is directed to embodiments of the present disclosure, other and further embodiments of the disclosure may be devised without departing from the basic scope thereof, and the scope thereof is determined by the claims that follow.

What is claimed is:

1. A data storage arrangement, comprising:
   at least one physical layer (PHY), wherein the at least one PHY is coupled to a host;
   at least one translucid PHY, wherein the at least one translucid PHY is wirelessly coupled to at least one charging arrangement, wherein the at least one charging arrangement comprises a laser beam charge, and wherein the at least one charging arrangement is frequency tuned to match to a circuit of the at least one translucid PHY;
   a logic circuit connected to the at least one PHY and the at least one translucid PHY; and
   a central processing unit (CPU) connected to the logic circuit.

2. The data storage arrangement according to claim 1, wherein the at least one PHY, at least one translucid PHY, logic circuit, and the CPU are disposed within an application specific integrated circuit (ASIC).

3. The data storage arrangement according to claim 1, further comprising:
   at least one electric power input; and
   the at least one charging arrangement is configured to provide power wirelessly to the at least one translucid PHY via a laser.

4. The data storage arrangement according to claim 1, wherein the at least one PHY is a peripheral component interconnect express (PCIe) PHY, universal serial bus (USB), Thunderbolt, universal flash storage (UFS), Serial Advanced Technology Attachment (SATA), serial-attached Small Computer System Interface (SAS), or combinations thereof.

5. The data storage arrangement according to claim 1, wherein the at least one translucid PHY is configured to wirelessly interface with the at least one charging arrangement to power the arrangement without host power.

6. A data storage arrangement, comprising:
   a storage controller application specific integrated circuit (ASIC), including:
      at least one central processing unit (CPU);
      at least one logic circuit coupled to the at least one CPU;
      at least one physical layer (PHY) coupled to the at least one logic circuit; and
      at least one translucid PHY coupled to the at least one logic circuit; and
   at least one charging arrangement coupled to the storage controller ASIC, wherein the at least one translucid PHY is wirelessly coupled to at least one charging arrangement, wherein the at least one charging arrangement comprises a laser beam charge, and wherein the at least one charging arrangement is frequency tuned to match to a circuit of the at least one translucid PHY.

7. The data storage arrangement of claim 6, wherein the at least one charging arrangement is coupled to the at least one translucid PHY.

8. The data storage arrangement of claim 6, wherein the at least one charging arrangement is a laser.

9. The data storage arrangement of claim 6, wherein the at least one charging arrangement is wirelessly coupled to the storage controller ASIC.

10. The data storage arrangement of claim 6, wherein the at least one charging arrangement is capable of providing electrical power to the at least one CPU.

11. The data storage arrangement of claim 6, wherein the at least one translucid PHY is capable of providing access to data.

12. The data storage arrangement of claim 11, wherein the at least one translucid PHY has an operating mode where the at least one translucid PHY is capable of identifying sub-species malware file searches with read access to storage device.

13. The data storage arrangement of claim 12, wherein the at least one translucid PHY has a sleeping mode where the at least one translucid PHY is capable of providing no communication to a host device and can communicate with a storage device.

14. The data storage arrangement of claim 13, wherein the at least one translucid PHY is switchable between the sleeping mode and the operation mode using the at least one logic circuit.

15. The data storage arrangement of claim 6, wherein the at least one translucid PHY is capable of identifying malware.

* * * * *